(12) United States Patent
Litvinov et al.

(10) Patent No.: US 6,798,615 B1
(45) Date of Patent: Sep. 28, 2004

(54) PERPENDICULAR RECORDING HEAD WITH RETURN POLES WHICH REDUCE FLUX ANTENNA EFFECT

(75) Inventors: Dmitri Litvinov, Pittsburgh, PA (US); Sakhrat Khizroev, Pittsburgh, PA (US); Billy Wayne Crue, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 400 days.

(21) Appl. No.: 09/815,482

(22) Filed: Mar. 23, 2001

Related U.S. Application Data
(60) Provisional application No. 60/192,053, filed on Mar. 24, 2000.

(51) Int. Cl.$^7$ .............................................. G11B 5/127
(52) U.S. Cl. ...................................................... 360/125
(58) Field of Search ............................... 360/125, 126, 360/121, 119, 123

(56) References Cited

U.S. PATENT DOCUMENTS

| | | | |
|---|---|---|---|
| 3,940,797 A | 2/1976 | Brock et al. | |
| 4,317,148 A | 2/1982 | Chi | |
| 4,423,450 A | * 12/1983 | Hamilton | 360/123 |
| 4,438,471 A | 3/1984 | Oshiki et al. | |
| 4,541,026 A | 9/1985 | Bonin et al. | |
| 4,546,398 A | 10/1985 | Toda et al. | |
| 4,575,777 A | 3/1986 | Hosokawa | |
| 4,613,918 A | 9/1986 | Kanai et al. | |
| 4,635,153 A | * 1/1987 | Shimamura et al. | 360/125 |
| 4,649,449 A | 3/1987 | Sawada et al. | |
| 4,725,909 A | 2/1988 | Kawai | |
| 4,731,157 A | 3/1988 | Lazzari | |
| 4,799,115 A | 1/1989 | Rogers et al. | |
| 4,974,110 A | 11/1990 | Kanamine et al. | |
| 5,003,423 A | * 3/1991 | Imamura et al. | 360/125 |
| 5,073,836 A | 12/1991 | Gill et al. | |
| RE35,212 E | 4/1996 | Barnes et al. | |

(List continued on next page.)

FOREIGN PATENT DOCUMENTS

| | | |
|---|---|---|
| EP | 0326904 A1 | 8/1989 |
| JP | 54128719 | 10/1979 |
| JP | 5504734 A | 1/1980 |
| JP | 55055420 | 4/1980 |
| JP | 55080818 | 6/1980 |
| JP | 56087218 | 7/1981 |
| JP | 57033421 | 2/1982 |
| JP | 59195311 | 11/1984 |
| JP | 59231720 | 12/1984 |
| JP | 60059515 | 5/1985 |
| JP | 60124014 | 7/1985 |

OTHER PUBLICATIONS

S.H. Charap et al., "Thermal Stability of Recorded Information at High Densities," *IEEE Transactions on Magnetics*, vol. 33, No. 1, Jan. 1997.

S.K. Khizroev et al., "Recording Heads with Track Widths Suitable for 100 Gbit/in$^2$ Density," *IEEE Transactions on Magnetics*, vol. 35, No. 5, Sep. 1999.

Kazuyuki Ise et al., "High Writing–Sensitivity Single–Pole Head with Cusp–Field Coils," *IEEE Transactions on Magnetics*, vol. 36, No. 5, Sep. 2000.

Kazuhiro Ouchi, "Recent Advancements in Perpendicular Magnetic Recording," *IEEE Transactions on Magnetics*, vol. 37, No. 4, Jul. 2001.

*Primary Examiner*—Allen Cao
(74) *Attorney, Agent, or Firm*—Alan G. Towner, Esq.; Pietragallo, Bosick & Gordon

(57) ABSTRACT

A perpendicular magnetic recording head includes a main write pole and multiple return poles. The size of each return pole is controlled in order to provide substantially the same magnetic reluctance through each return pole. The return poles effectively reduce or eliminate the flux antenna effect caused by stray magnetic fields.

22 Claims, 2 Drawing Sheets

U.S. PATENT DOCUMENTS

| | | | |
|---|---|---|---|
| 5,726,839 A | * | 3/1998 | Shinohara et al. .......... 360/313 |
| 5,738,927 A | | 4/1998 | Nakamura et al. |
| 5,920,449 A | * | 7/1999 | Tagawa ...................... 360/122 |
| 6,072,669 A | | 6/2000 | Indeck |
| 6,111,724 A | | 8/2000 | Santini |
| 6,134,089 A | | 10/2000 | Barr et al. |
| 6,172,848 B1 | | 1/2001 | Santini |
| 6,201,670 B1 | | 3/2001 | Chang et al. |
| 6,278,591 B1 | | 8/2001 | Chang et al. |
| 6,282,056 B1 | | 8/2001 | Feng et al. |
| 6,574,072 B1 | * | 6/2003 | Batra ......................... 360/125 |
| 6,646,827 B1 | * | 11/2003 | Khizroev et al. ........... 360/125 |
| 6,667,848 B1 | * | 12/2003 | Khizroev et al. ........... 360/125 |
| 6,721,131 B2 | * | 4/2004 | Litvinov et al. ............ 360/125 |
| 2002/0131203 A1 | * | 9/2002 | Litvinov et al. ............ 360/125 |

* cited by examiner

6,798,615 B1

PERPENDICULAR RECORDING HEAD WITH RETURN POLES WHICH REDUCE FLUX ANTENNA EFFECT

CROSS REFERENCE TO RELATED APPLICATION

This application claims the benefit of U.S. Provisional Patent Application Serial No. 60/192,053 filed Mar. 24, 2000.

FIELD OF THE INVENTION

The present invention relates to perpendicular magnetic recording heads, and more particularly relates to a perpendicular recording head having a main write pole and multiple return poles which reduce or eliminate the flux antenna effect caused by stray magnetic fields.

BACKGROUND INFORMATION

Perpendicular magnetic recording systems have been developed for use in computer hard disk drives. A typical perpendicular recording head includes a trailing main pole, a leading return pole magnetically coupled to the main pole, and an electrically conductive magnetizing coil surrounding the main pole. The bottom of the return pole has a surface area greatly exceeding the surface area of the tip of the main pole. Conventional perpendicular recording media typically include a hard magnetic recording upperlayer and a soft magnetic underlayer which provide a flux path from the trailing write pole to the leading return pole of the writer.

To write to the magnetic recording media, the recording head is separated from the magnetic recording media by a distance known as the flying height. The magnetic recording media is moved past the recording head so that the recording head follows the tracks of the magnetic recording media, with the magnetic recording media first passing under the return pole and then passing under the main pole. Current is passed through the coil to create magnetic flux within the main pole. The magnetic flux passes from the main pole tip, through the hard magnetic recording track, into the soft underlayer, and across to the return pole.

The closed magnetic flux path provided by the trailing pole, soft underlayer and return pole increases efficiency of such conventional systems. The soft underlayer also effectively doubles the recording layer thickness through the effect of magnetic imaging. Furthermore, the soft underlayer advantageously increases vertical field gradients in the recording media through the magnetic imaging effect.

However, a problem associated with the use of soft underlayers is that such layers cause extreme sensitivity of the perpendicular recording system to stray magnetic fields. For example, stray fields of approximately 5 œ, e.g., from a voice coil motor, may be sufficient to cause data instability and to initiate random erasing of previously written information. This problem resulting from stray magnetic fields is known as the flux antenna effect.

The present invention has been developed in view of the foregoing.

SUMMARY OF THE INVENTION

An aspect of the present invention is to provide a perpendicular magnetic recording head comprising a main write pole and multiple return poles. The return poles substantially eliminate the flux antenna effect during operation of the recording head.

Another aspect of the present invention is to provide a perpendicular magnetic recording system comprising a perpendicular magnetic recording medium including a hard magnetic recording layer and a soft magnetic underlayer, and a perpendicular magnetic recording head positionable over the medium. The recording head comprises a main write pole, and multiple return poles.

A further aspect of the present invention is to provide a method of making poles of a perpendicular magnetic recording head. The method includes the steps of depositing a first return pole layer, depositing a main write pole layer over at least a portion of the first return pole layer, and depositing a second return pole layer over at least a portion of at least one of the first return pole layer and main write pole layer.

These and other aspects of the present invention will be more apparent from the following description.

DETAILED DESCRIPTION

Figure 1:
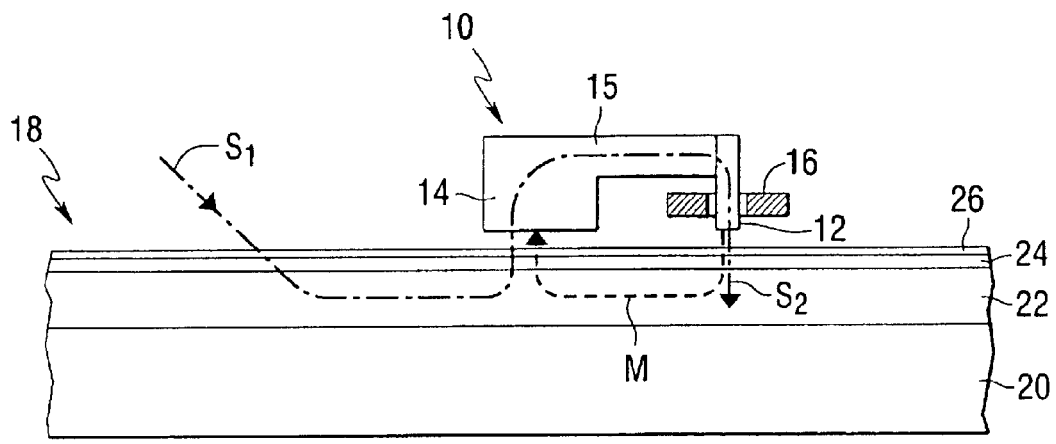
FIG. 1 is a partially schematic sectional side view of a conventional perpendicular magnetic recording system including a writer having a trailing main pole and a leading return pole, illustrating the problem caused by a stray magnetic field which travels through the soft underlayer of the recording media, and which is amplified as it travels through the head from the return pole to the main pole.

FIG. 1 schematically illustrates a perpendicular recording head 10 which includes a trailing main write pole 12 and a leading return pole 14 connected by a yoke 15. A magnetizing coil 16 surrounds the main pole 12. The perpendicular recording head 10 is positioned above a magnetic recording disk 18. The disk 18 includes a substrate 20, a soft magnetic underlayer 22, a hard magnetic recording layer 24 and a protective layer 26. The disk 18 may also include a magnetic decouple layer (not shown) between the soft underlayer 22 and recording layer 24.

As shown in FIG. 1, when current is passed through the coil 16, a closed magnetic flux path is generated which travels along a path M from the tip of the main pole 12 perpendicularly through the recording layer 24, across the soft underlayer 22 to the return pole 14. A problem associated with the design shown in FIG. 1 is that stray magnetic fields $S_1$ enter the soft underlayer 22 of the disk 18 and, due to the closed magnetic path between the opposing pole 14 and the main pole 12, are drawn into the recording head 10 through the opposing pole 14. The stray magnetic fields $S_1$ may be produced by such sources as voice coil motors (up to 50 œ fields), and some bit patterns under the leading pole which can generate fields up to 50 œ and higher due to the soft underlayer.

As shown in FIG. 1, stray fields $S_1$ under the return pole 14 get amplified approximately by the ratio of the area of the return pole 14 to the area of the main pole 12. This causes a deleterious flux antenna effect. With this ratio being approximately 50 for typical designs, the fields $S_2$ can be amplified, e.g., up to 2,500 œ, under the main pole. This can be sufficient to cause data instability or even erase previously written information.

Figure 2:
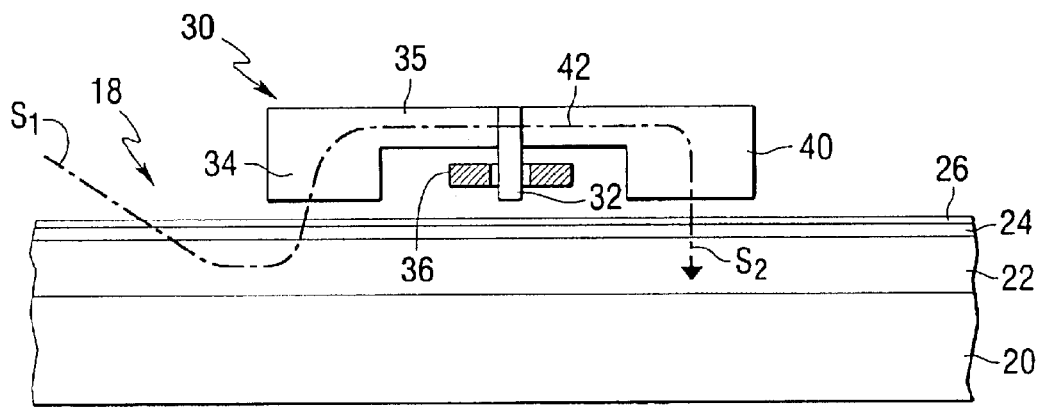
FIG. 2 is a partially schematic sectional side view of a perpendicular magnetic recording head having a main write pole and two return poles in accordance with an embodiment of the present invention.

FIG. 2 schematically illustrates a perpendicular recording head 30 in accordance with an embodiment of the present invention. Similar to the embodiment shown in FIG. 1, the recording head 30 of FIG. 2 includes a main write pole 32, a leading return pole 34, and an interconnecting yoke 35. A magnetizing coil 36 surrounds the main pole 32. The recording head 30 includes a second return pole 40 connected to the main pole 30 by an interconnecting yoke 42.

As shown in FIG. 2, the second return pole 40 reduces or eliminates the flux antenna effect by providing a flux path for stray magnetic fields which essentially circumvents the main pole 32. The stray magnetic field $S_1$ which enters the return pole 34 travels through the yokes 35 and 42 and exits the head via the return pole 40. In the embodiment shown in FIG. 2, the stray magnetic field $S_2$ exiting the return pole 40 is approximately the same order of magnitude as the incoming stray magnetic field $S_1$. The ratio of $S_1:S_2$ is about equal, and the flux antenna effect is substantially eliminated, thereby avoiding data instability and possible unwanted erasure of the magnetic recording layer 24.

Figure 3:
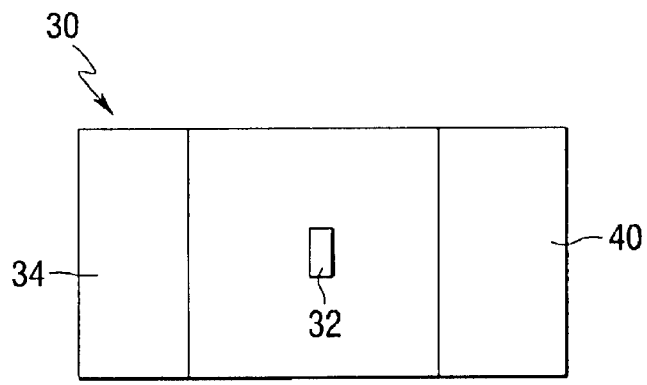
FIG. 3 is a partially schematic bottom view of the recording head of FIG. 2, illustrating the relatively small cross sectional area of the main write pole and the relatively large cross sectional areas of the return poles at the air bearing surface of the recording head.

FIG. 3 illustrates the air bearing surface of the recording head 30. The main pole 32 has a relatively small cross sectional area, while the first and second return poles 34 and 40 each have relatively large areas at the air bearing surface. The ratio of the air bearing surface area of the first return pole 34 to the second return pole 40 may range from about 1:2 to about 2:1, typically from about 1:1.5 to about 1.5:1. In a particular embodiment, the air bearing surface area ratio of the first and second return poles 34 and 40 is about 1:1. The relative cross sectional areas of the yokes 35 and 42 may be similar to the relative cross sectional areas of the first and second return poles 34 and 40. The air bearing surface area of the main pole 32 is typically at least 10 times smaller than either of the air bearing surface areas of the first and second return poles 34 and 40, for example, at least 20 times smaller.

In accordance with the present invention, the magnetic reluctance of the first return pole 34 should be approximately equal to the magnetic reluctance of the second return pole 40. Similarly, the magnetic reluctance of the yokes 35 and 42 should be approximately equal. When the first and second return poles 34 and 40 are made of the same or similar materials, the relative magnetic reluctance is equalized by controlling the relative cross sectional areas of the return poles, as shown in FIGS. 2 and 3. Alternatively, the magnetic reluctance of the return poles may be substantially equalized by using different types of materials having different magnetic properties for each pole. For example, if the material of the second return pole 40 has a permeability that is higher than the permeability of the material of the first return pole 34, the cross sectional area of the second return pole 40 may be smaller than the cross sectional area of the first return pole 34.

In the embodiment shown in FIGS. 2 and 3, the first and second return poles 34 and 40 are provided on opposite sides of the main pole 32, and are spaced substantially equal distances therefrom. However, other return pole configurations may be used in accordance with the present invention. For example, more than two return poles may be provided. Instead of two separate return poles as shown in FIG. 3, the return poles may be connected at or near the air bearing surface to provide a configuration which at least partially surrounds the main pole 32 at the air bearing surface. Although the first and second return poles 34 and 40 shown in FIGS. 2 and 3 are aligned with the main pole 32 in a direction parallel with the track direction of the recording media 18, different alignments may be used. For example, the return poles and the main pole may be aligned in a direction perpendicular to the track direction of the recording media. Furthermore, although the main pole 32 is centrally aligned with respect to the return poles 34 and 40 in the embodiments shown in FIGS. 2 and 3, the main pole 32 could be positioned closer to one return pole than the other return pole, or could be positioned at a location which does not lie directly between the return poles.

Figure 4:
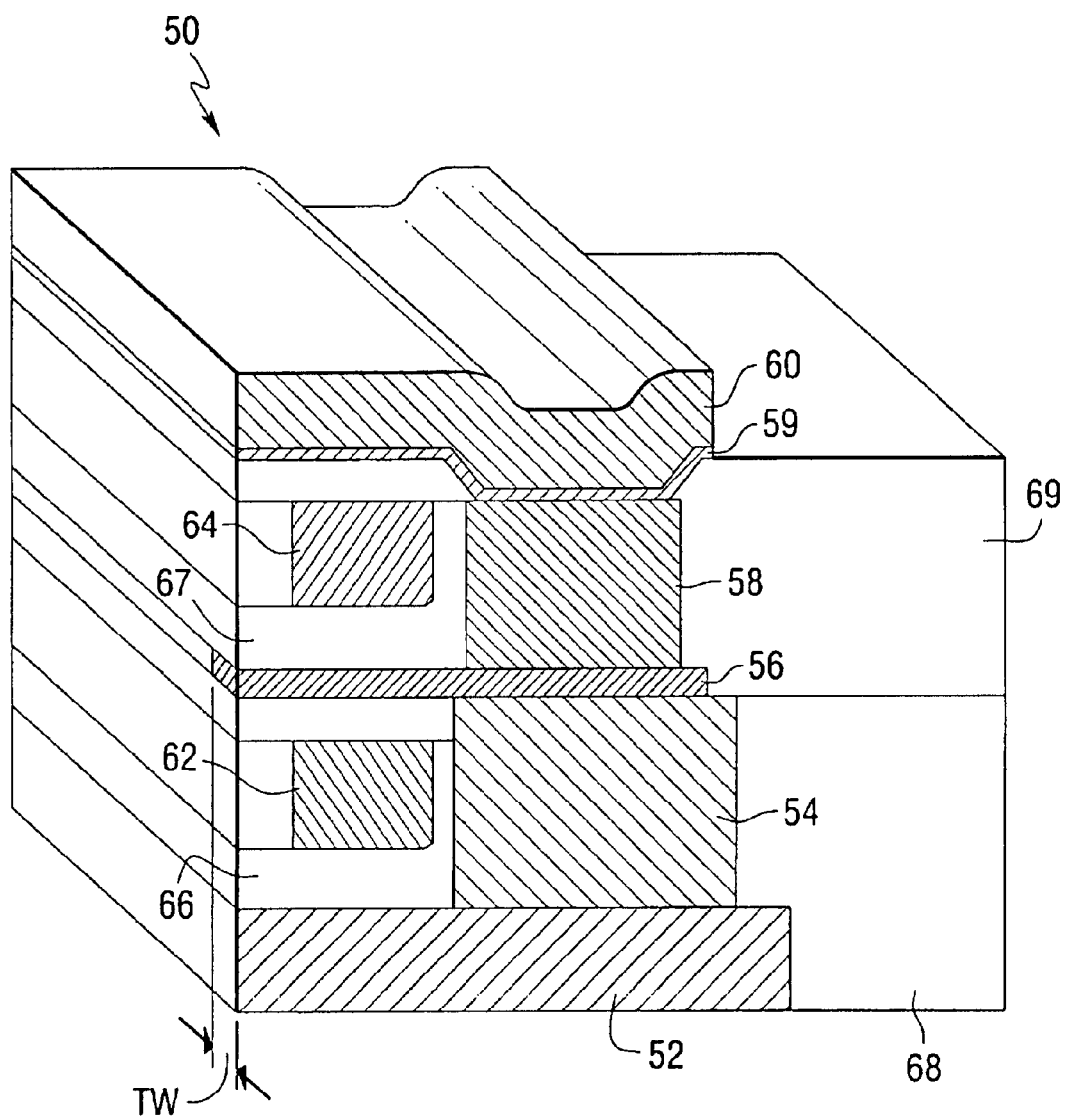
FIG. 4 is an isometric view illustrating deposited layers of a perpendicular magnetic recording head having a main write pole and two return poles in accordance with an embodiment of the present invention.

FIG. 4 illustrates various deposited layers of a perpendicular recording head 50 in accordance with an embodiment of the present invention. The magnetically permeable components of the recording head 50 include a first return pole 52 upon which a first pedestal 54 has been deposited. The main write pole 56 is deposited over the first pedestal 54. The tip of the main pole 56 at the air bearing surface of the recording head 50 defines a track width TW of the recording head 50. A second magnetically permeable pedestal 58 is deposited on the main pole 56. A seed layer 59 comprising NiFe is deposited on the second pedestal 58, followed by deposition of the second return pole 60. The first return pole 52, first pedestal 54, main write pole 56, second pedestal 58 and second return pole 60 may be made of any suitable magnetically permeable material(s) such as NiFe or NiFeCo.

The thickness of the main pole 56 typically ranges from about 100 to about 3,000 nm. The track width TW of the main pole 56 typically ranges from about 25 to about 1,000 nm. The thicknesses of the first and second return poles 52 and 60 typically range from about 250 to about 3,000 nm. The thicknesses of the first and second pedestals 54 and 58 typically range from about 1 to about 3 micron. However, the thicknesses of the various magnetically permeable components may be controlled as desired.

As shown in FIG. 4, a magnetization coil is provided which comprises first and second conductive lines 62 and 64 deposited on opposite sides of the main pole 56. The conductive lines 62 and 64 may be made of any suitable electrically conductive material such as Cu, Au or Ag. The recording head 50 also includes several deposited layers of insulating material 66, 67, 68 and 69 such as alumina, silicon nitride or the like.

The various layers shown in FIG. 4 may be formed by standard deposition techniques. For example, the poles 52, 56 and 60, as well as the pedestals 54 and 58, may be deposited by plating or vacuum deposition techniques. The conductive lines 62 and 64 may be deposited by plating. The insulating layers 66, 67, 68 and 69, and the seed layer 59, may be deposited by vacuum deposition.

Whereas particular embodiments of this invention have been described above for purposes of illustration, it will be evident to those skilled in the art that numerous variations of the details of the present invention may be made without departing from the invention as defined in the appended claims.

What is claimed is:

1. A perpendicular magnetic recording head comprising:
a main write pole and multiple return poles; and
means for substantially eliminating a flux antenna effect during operation of the recording head, wherein the main write pole and at least one of the return poles are substantially aligned in a direction parallel with a recording direction of the recording head, which is substantially parallel with a track direction of a recording medium.

2. The perpendicular magnetic recording head of claim 1, wherein the main write pole has a track width less than a width of each of the return poles.

3. A perpendicular magnetic recording head comprising:
a main write pole; and
multiple return poles, wherein the main write pole and at least one of the return poles are substantially aligned in a direction parallel with a recording direction of the recording head, which is substantially parallel with a track direction of a recording medium.

4. The perpendicular magnetic recording head of claim 3, wherein the multiple return poles comprise a first and a second return pole.

5. The perpendicular magnetic recording head of claim 4, wherein the first and second return poles have substantially the same magnetic reluctance.

6. The perpendicular magnetic recording head of claim 4, wherein the first and second return poles have surface areas at an air bearing surface of the recording head, and the ratio of the first return pole surface area to the second return pole surface area is from about 1:2 to about 2:1.

7. The perpendicular magnetic recording head of claim 6, wherein the ratio of the first return pole surface area to the second return pole surface area is from about 1:1.5 to about 1.5:1.

8. The perpendicular magnetic recording head of claim 6, wherein the ratio of the first return pole surface area to the second return pole surface area is about 1:1.

9. The perpendicular magnetic recording head of claim 4, wherein the first return pole is connected to the main write pole by a first interconnecting yoke, the second return pole is connected to the main write pole by a second interconnecting yoke, and the first and second interconnecting yokes have substantially the same magnetic reluctance.

10. The perpendicular magnetic recording head of claim 9, wherein the first and second interconnecting yokes have substantially the same cross sectional areas defined by a plane through each interconnecting yoke in a direction perpendicular to a magnetic flux path through each yoke.

11. The perpendicular magnetic recording head of claim 4, wherein the main write pole has a surface area at an air bearing surface of the recording head which is substantially smaller than a surface area of each of the first and second return poles at the air bearing surface.

12. The perpendicular magnetic recording head of claim 4, wherein the main write pole is located between the first and second return poles.

13. The perpendicular magnetic recording head of claim 12, wherein the main write pole is located a substantially equal distance between the first and second return poles.

14. The perpendicular magnetic recording head of claim 4, wherein the main write pole and the first and second return poles are substantially aligned.

15. The perpendicular magnetic recording head of claim 3, wherein the main write pole has a track width less than a width of each of the return poles.

16. A perpendicular magnetic recording system comprising:
(a) a perpendicular magnetic recording medium including a hard magnetic recording layer and a soft magnetic underlayer; and
(b) a perpendicular magnetic recording head positionable over the medium, the recording head comprising:
(i) a main write pole; and
(ii) multiple return poles, wherein the main write pole and at least one of the return poles are substantially aligned in a direction parallel with a recording direction of the recording head, which is substantially parallel with a track direction of the recording medium.

17. The perpendicular magnetic recording system of claim 16, wherein the multiple return poles comprise first and second return poles having substantially the same magnetic reluctance.

18. The perpendicular magnetic recording system of claim 17, wherein the first return pole is connected to the main write pole by a first interconnecting yoke, the second return pole is connected to the main write pole by a second interconnecting yoke, and the first and second interconnecting yokes have substantially the same magnetic reluctance.

19. The perpendicular magnetic recording system of claim 16, wherein the main write pole has a track width less than a width of each of the return poles.

20. A method of making poles of a perpendicular magnetic recording head, the method comprising:
depositing a first return pole layer;
depositing a main write pole layer over at least a portion of the first return pole layer; and
depositing a second return pole layer over at least a portion of at least one of the first return pole layer and main write pole layer, wherein the main write pole and at least one of the return poles are substantially aligned in a direction parallel with a recording direction of the recording head, which is substantially parallel with a track direction of a recording medium.

21. The method of claim 20, wherein the first and second return pole layers have substantially the same thicknesses.

22. The method of claim 20, wherein the main write pole has a track width less than a width of each of the return poles.

* * * * *